United States Patent [19]

Stockhausen et al.

[11] Patent Number: 5,830,956
[45] Date of Patent: Nov. 3, 1998

[54] BIODEGRADABLE COPOLYMERS, METHODS OF PRODUCING THEM AND THEIR USE

[75] Inventors: Dolf Stockhausen, Krefeld; Frank Krause, Kleve; Helmut Klimmek, Krefeld, all of Germany

[73] Assignee: Chemische Fabrik Stockhausen GmbH, Krefeld, Germany

[21] Appl. No.: 535,287

[22] PCT Filed: Jan. 4, 1994

[86] PCT No.: PCT/EP94/00006

§ 371 Date: Aug. 23, 1995

§ 102(e) Date: Aug. 23, 1995

[87] PCT Pub. No.: WO94/15978

PCT Pub. Date: Jul. 21, 1994

[30] Foreign Application Priority Data

Jan. 14, 1993 [DE] Germany ............... 43 00 772.4

[51] Int. Cl.⁶ .............. C08F 220/04; C08F 222/00; C08L 29/04; C11D 3/37
[52] U.S. Cl. ............. 526/318.2; 526/271; 526/318.4; 526/328; 525/60; 524/557; 524/803; 510/108; 510/367; 528/489
[58] Field of Search ............... 526/271, 328, 526/318.2, 318.4, 318.42; 252/60; 524/557, 803; 528/489

[56] References Cited

U.S. PATENT DOCUMENTS 3,887,480  6/1975  Rue et al. ................. 252/135
4,725,655  2/1988  Denzinger et al. .......... 526/271
5,191,048  3/1993  Swift et al. .............. 526/271
5,264,510  11/1993 Swift et al. .............. 526/271

FOREIGN PATENT DOCUMENTS 0497611  8/1992  European Pat. Off. .

*Primary Examiner*—Tae Yoon
*Attorney, Agent, or Firm*—Oblon, Spivak, McClelland, Maier & Neustadt, P.C.

[57] ABSTRACT

The present invention relates to biodegradable polymers built-up of a) monoethylenically unsaturated dicarboxylic acids and/or the salts thereof, b) monoethylenically unsaturated monocarboxylic acids and/or the salts thereof, c) monounsaturated monomers which, after hydrolysis, can be converted to monomers with a hydroxyl group covalently bonded to the C-C-chain, and, optionally, d) further radically copolymerizable monomers, with the sum of the monomers according to a) to d) amounting to 100%.

The present invention further relates to a process of producing said polymers by radical polymerization and hydrolysis in aqueous medium, and to the use of said polymers as additive or cobuilder in detergents and cleaning agents, in the pretreatment of cotton, as bleaching stabilizers, as auxiliary agent in textile printing and in the manufacture of leather, as well as in the inhibition of water hardness and as dispersing agent.

16 Claims, No Drawings

BIODEGRADABLE COPOLYMERS, METHODS OF PRODUCING THEM AND THEIR USE

The present invention relates to water-soluble biodegradable copolymers based on unsaturated mono- and dicarboxylic acids and vinyl esters or vinyl ethers. The present invention further relates to a process for the production of said copolymers and to their use in detergents and cleaning agents, in the inhibition of water hardness, as dispersing agents, as well as in the manufacture, finishing and/or dyeing of textile fibers and textiles.

Since ecological considerations have come to the fore within the last years, many of the efforts to develop new polymers have focussed on the biodegradability thereof. In particular, products whose application and disposal is effected in aqueous systems have been of interest. In some fields, for example, the papermaking industry, degradable polymers such as starches have been used as binders more frequently; in other fields graft polymers of reproductive resources, such as starch or sugar, and of synthetic monomers have been developed. However, for many applications there are relatively high technical requirements, and the products based on reproducible raw materials are not able to meet these standards to the degree the purely synthetic polymers used until today do. An example thereof is the use of the polycarboxylates in mixed sizes for textile fibers; here a mixture of starch and polycarboxylate is frequently used as a compromise between degradability and sizing properties.

Another important field of application for water-soluble polymers is the use in detergents and cleaning agents.

During the last years, the development on this sector has been determined by the use of polyphosphate components which—as is generally known—result in overfertilization of the waters and, consequently, in the problems known as "eutrophication".

In addition to the primary cleaning effect, polyphosphates have a favorable secondary detergent behavior; they remove alkaline-earth metal ions from the washings, textiles and dirt, prevent precipitations of insoluble alkaline-earth metal salts on the textiles, and maintain the dirt in the washing liquor in disperse condition. In this manner incrustations and redepositions are suppressed even after several wash cycles. Due to their good binding capacity for alkaline-earth ions and their excellent dispersing and soil-carrying capacity, polycarboxylates such as polyacrylic acids and acrylic acid/maleic acid copolymers currently dominate the market as substitutes for polyphosphates. The latter property is achieved in a particularly easy manner by using acrylic acid/maleic acid copolymers [Richter, Winkler in Tenside Surfactants Detergents 24 (1987) 4]. The problem of eutrophication has been answered with the use of polycarboxylates. However, these synthetic polymers must be regarded as being substantially inert towards degradation processes. Because of the already existing and the coming increasing spread of said polymers, the question "what happens with them in the ecosystem" arises. Examinations to this respect showed that about 90% of the polycarboxylates are adsorbed to and disposed by the sewage sludge, i.e. by deposition, agricultural utilization or combustion. Biological degradation takes place to a very limited extent, the cited degradation rates amounting to between 1 and 10%. The statements to this respect can be found in the publications of J. Lester et al. "The partitioning of polycarboxylic acids in activated sludge", Chemosphere, Vol. 21, Nos. 4–5, pp 443–450 (1990), H. Schumann "Elimination von $^{14}$C-markierten Polyelektrolyten in biologischen Abwasserreinigungsprozessen, Wasser•Abwasser (1991), pp 376–383, P. Berth "Möglichkeiten und Grenzen des Ersatzes von Phosphaten in Waschmitteln", Angewandte Chemie (1975), pp 115–142.

For this reason, introducing large amounts of non-degradable compounds in the environment is critical from the ecological point of view. To solve this problem, the use of biodegradable polymers, i.e., those demineralizable to carbon dioxide and water seems to be obvious.

The production of a biodegradable polycarboxylate polymer based on glyoxylic acid esters is known from U.S. Pat. No. 4,144,226. To achieve technically interesting molecular weights, the mentioned polymerization methods in anhydrous organic solvents require temperatures of 0° C. or less, achieving polymer yields of only 75%; further reducing isolation and cleaning steps follow. Since the polymer is instable in the acid or alkaline pH-range, the end groups thereof must additionally be blocked chemically. Nevertheless, a reduced molecular weight caused by chain scission and, consequently, a loss of activity may occur during the liberation of the carboxyl groups from the ester form by means of saponification. Said polymers are not suitable to be used in large amounts in the aforementioned applications because very costly and commercially unavailable monomers and very expensive polymerization and processing techniques are to be employed and because they exhibit the described instability.

British Pat. No. 1,385,131 describes a detergent composition using a biodegradable polymer of maleic acid and vinyl alcohol units.

The production process includes a precipitation polymerization in benzene, the separation and drying of the polymer, and the hydrolysis and saponification thereof in an aqueous alkaline medium. Leaving the relatively complicated and costly production of these polymers out of consideration, additional disadvantages with respect to degradability and property profile become apparent. According to the indications relating to degradability, a drastic decrease in degradation goes along with the molecular weight. A molecular weight increase from 4,200 to 18,000 already means a reduction in the degradation by 63%. With respect to the properties it must be mentioned that a graying inhibition that is superior to sodium tripolyphoshpate can be achieved with the maleic acid/vinyl alcohol polymers only when they are used in detergent formulations in an amount of at least 35%. As compared to the state of the art the uneconomically high polymer concentrations in detergents are disadvantageous, currently used detergent formulations comprise about 5% of polymer (DE 40 08 696).

According to British Pat. No. 1,284,815 maleic acid-vinyl alcohol copolymers are also used as substitutes for phosphate in detergents and cleaning agents. It is recommended to use 10 to 80%-wt., preferably 15 to 60%-wt., relative to the detergent or cleaning agent; again, this means applying uneconomically high concentrations and, in addition, it points to a poor efficiency if lower concentrations are used.

EP 0 497 611 A1 describes the production and the use of improved and partially biodegradable polymers based on maleic acid, acrylic acid and vinyl acetate, which are polymerized in an organic solvent and subsequently subjected to an aqueous hydrolysis. Furthermore, the possibility of modifying the polymers by subsequent saponification, optionally followed by an oxidation reaction is described. As compared with the aqueous procedure, the polymerization in an organic solvent is described as a necessary method since, on the one hand, any desired monomer ratio in the polymer may thus be realized and, on the other hand, undesired hydrolysis reactions of the monomers may not occur. The degradability of the terpolymers according to EP 0,497,611 A1 was tested in a Closed-Bottle-Test and assessed within a scale of 0 to 100% BOD (Biological Oxygen Demand) after 25 days. A pure polyacrylic acid having 1.8% and a copolymer of maleic acid and vinyl acetate having 8% degradability are mentioned in said test run. The products manufactured in the organic solvent were examined in hydrolyzed and saponified form with different mole ratios of the monomers used, resulting in a biological degradation of 13.6–28.9%.

However, such degrees of degradation are still absolutely insufficient. For this reason, the polymers obtained according to the process of EP 0,497,611 A1 in organic solvents do not offer a solution with respect to products degrading in a good or easy manner. According to P. Schöberl "Methoden zur Bestimmung der biologischen Abbaubarkeit von Tensiden" in Seifen-Öle-Fette-Wachse 117 (1991), pp 740–744, the required degree of degradation in the Close-Bottle-Test should amount to $\geq$ 60% to classify a product as being degradable. A product can be classified as an easily degradable one if within 10 days—after exceeding a degree of degradation of 10%—a degradation degree of $\geq$ 60% is achieved.

EP 0 398 724 A2 describes a process for the production of maleic acid/acrylic acid copolymers in aqueous solution; acid-free monomers may also be used. Said production process is particularly based on the specific simultaneous dosage of all monomer components and other reagents necessary for the polymerization. Although no particular emphasis is given to the biodegradability of the polymers, these values are measured in three comparative examples. Example 1 illustrates the production of a copolymer of maleic acid and acrylic acid and indicates the biodegradation after 30 days with 3.3% (BOD).

Example 5 describes a copolymer of maleic acid, acrylic acid and 10.6%-wt. vinyl acetate having a biodegradation of 9.6% (BOD) after 30 days. Example 6 describes a copolymer of maleic acid, acrylic acid and 10.6%-wt. 2-hydroxyethylmethacrylate having a degree of degradation of 7% after 30 days. Accordingly, the degradation rates are also insufficient. All these examples describe the polymerization in aqueous solution with dosing the mentioned monomers, catalysts (hydrogen peroxide and persulfate), and sodium hydroxide solution, which is used to partially neutralize the acid monomers, in the course of the polymerization. After termination of the polymerization reaction, standardization to neutral is effected with 50% sodium hydroxide solution at 70° C.

The aforementioned facts clearly demonstrate that these polymers which are manufactured by polymerization in water do not represent a solution for degradable cobuilders.

Accordingly, there has been the object to provide copolymers based on maleic acid/acrylic acid which may be manufactured in aqueous medium by means of a technically simple process using technically easily available monomers, which have the good binding capacity for alkaline-earth ions required for their use in detergents and cleaners, which have a good dispersive power and—as compared to the polymers according to the prior art—are readily or even excellently degradable.

According to the present invention this object is achieved by biodegradable polymers suitable for detergents and cleaners of a) polymerized, monoethylenically unsaturated dicarboxylic acids and/or the salts thereof, b) polymerized, monoethylenically unsaturated monocarboxylic acids and/or the salts thereof, C) polymerized, monoethylenically unsaturated monomers which, after hydrolysis or saponification, have one or several hydroxyl groups covalently bonded to the C–C-chain, and optionally d) further polymerized, radically copolymerizable monomers, obtainable by an at least partial neutralization of the carboxylicacid-containing monomers a), b) and optionally d), radical polymerization of the monomers a) to d), and hydrolysis or saponification of the polymerized monomer units c) to form hydroxyl groups covalently bonded to the C—C-chain of the polymer in aqueous medium, the polymers exhibiting a biological degradation rate of greater than 60% (BOD) after 28 days.

The copolymers according to the present invention are preferably obtainable by radical polymerization of monomer mixtures of a) 10–70%-wt. monoethylenically unsaturated $C_{4-8}$-dicarboxylic acids or the salts thereof, b) 20–85%-wt. monoethylenically unsaturated $C_{3-10}$-monocarboxylic acids or the salts thereof, c) 1–50%-wt. monounsaturated monomers which, after saponification, release hydroxyl groups bonded at the polymer chain, d) 0–10%-wt. further, radically copolymerizable monomers, with the sum of the monomers according to a) to d) amounting to 100%

Preferred polymers according to the present invention have a biological degradation rate of greater than 80% BOD after 28 days.

Monomers of group a) include monoethylenically unsaturated $C_4$–$C_8$-dicarboxylic acids, the anhydrides or alkali and/or ammonium salts and/or amine salts thereof. Suitable dicarboxylic acids, for example, are maleic acid, fumaric acid, itaconic acid, methylene malonic acid. It is preferred to use maleic acid, maleic anhydride, itaconic acid, itaconic anhydride, as well as the corresponding sodium, potassium or ammonium salts of maleic or itaconic acid. The monomers of group a) are present in the monomer mixture to the extent of 10 to 70%-wt., preferably 20 to 60%-wt., and most preferably 25 to 55%-wt.

Suitable monomers of group b) include monoethylenically unsaturated $C_3$– to $C_{10}$-carboxylic acids and the alkali and/or ammonium salts and/or amine salts thereof. These monomers include, for example, acrylic acid, methacrylic acid, dimethyl acrylic acid, ethyl acrylic acid, vinyl acetic acid, allyl acetic acid. The preferred monomers of this group are acrylic acid, methacrylic acid, the mixtures thereof, as well as sodium, potassium or ammonium salts or mixtures thereof. The monomers of group b) are present in the monomer mixture to the extent of 20–85%-wt., preferably 25–60%-wt., and most preferably 30–60%-wt.

The monomers of group c) include those which - after the copolymerization - release one or more hydroxyl groups, which are directly covalently bonded to the C—C-polymer chain, in a cleavage reaction, e.g. by hydrolysis or saponification of the polymer. Examples thereof are: vinyl acetate, vinyl propionate, acetic acidmethyl vinyl ester, methyl vinyl ether, ethylene glycol monovinyl ether, vinylidene carbonate. The monomers of group c) are present in the monomer mixture to the extent of 1–50%-wt., preferably 4–40%-wt., and most preferably 8–30%-wt.

Monomers of group d) which are suitable to modify the copolymers, for example, include monomers comprising sulfone groups and sulfate groups, such as meth (allylsulfonic acid), vinyl sulfonic acid, styrene sulfonic acid, acrylamidomethylpropane sulfonic acid, and monomers comprising phosphoric acid, such as vinyl phosphonic acid, allyl phosphoric acid and acrylamidomethylpropane phosphonic acid and the salts thereof, as well as hydroxyethyl(meth)acrylate sulfates, allyl alcohol sulfates and -phosphates. In addition, suitable monomers of group d), which because of the required solubility are to be used in restricted amounts, include doubly ethylenically unsaturated non-conjugated compounds and polyalkylene glycol esters of (meth)acrylic acid and polyalkylene glycol ether with (meth)allyl alcohol, which may optionally be capped at the end. The monomers of group d) are present in the monomer mixture by up to 10%-wt., if necessary.

In addition, the present invention relates to a process for the production of biodegradable polymers suitable for the use in detergents and cleaning agents of a) monoethylenically unsaturated dicarboxylic acids and/or the salts thereof, b) monoethylenically unsaturated monocarboxylic acids and/or the salts thereof, c) monoethylenically unsaturated monomers which, after hydrolysis or saponification, are converted into monomer units having one or several hydroxyl groups covalently bonded to the C—C-chain, and d) optionally further, radically copolymerizable monomers, which are characterized in that the acid monomers a), b) and optionally f) are at least partially neutralized, the monomers a) to f) are radically polymerized, and that the polymerized monomer units c) are hydrolyzed or saponified in aqueous medium into hydroxyl groups covalently bonded to the C—C-chain of the polymer, the polymers having a biological degradation rate of greater than 60% (BOD) after 28 days.

The copolymers are manufactured in aqueous solution at 40°–180° C. in the presence of polymerization initiators forming radicals under the polymerization conditions, e.g. inorganic and organic peroxides, persulfates, azo compounds and so-called redox catalysts. The reducing component of redox catalysts may be formed, for example, by compounds such as sodium sulfite, sodium bisulfite, sodium formaldehyde-sulfoxylate and hydrazine. Since the exclusive use of persulfate usually results in broad molecular weight distributions and a low content of residual monomers, and the exclusive use of peroxides results in narrower molecular weight distributions and a high residual monomer content, it is advantageous to use as redox catalyst a combination of peroxide and/or persulfate, reducing agent, and heavy metal. The copolymerization may also be carried out by the action of ultraviolet radiation in the presence of photoinitiators. If the molecular weight must be controlled, polymerization regulators are used. Suitable chain transfer agents include mercapto compounds, alkyl compounds, aldehydes, heavy metal salts. The molecular weight may also be controlled by the choice of the material of the polymerization reactor; for example, the use of steel as reactor material results in lower molecular weights than the use of glass or enamel.

The polymerization is effected in conventional polymerization vessels at temperatures of 40°–1800° C., optionally under pressure if boiling temperatures of the reactants are exceeded. A preferred polymerization temperature range amounts to about 60° to 120° C. Operations are carried out in an inert gas atmosphere, if necessary created by injecting nitrogen, under the exclusion of atmospheric oxygen. The monomer components are either prepared as a whole in aqueous solution, or they are polymerized by addition of the initiator system. According to a preferred embodiment they are metered into the polymerization reactor over a period of 1 to 10 hours, preferably 2 to 8 hours.

According to an embodiment of the present invention, the monomer a) is prepared and the monomers b) to d) are metered thereto, either in admixture or separately. According to a preferred embodiment, maleic acid and part or the whole amount of the monomer according to group c) form the premixture/preparation and the remaining monomers are dosed thereto. This method of adding the monomers has the advantage that the pressure, which generates during the polymerization reaction in the closed polymerization vessel and is caused by the otherwise increased decarboxylation of maleic acid units in the polymer chain, is considerably reduced, i.e., the polymers manufactured according to this process comprise more carboxylate groups than those where the monomer of group c) has not been prepared beforehand.

The initiator system is added in parallel with the monomers, and after termination of the monomer dosage the addition thereof is preferably continued for a while to complete the monomer reaction. For the purpose of obtaining copolymers having a low residual content of maleic acid and in order to suppress a premature saponification of monomers of group c), the employed acid monomers are neutralized, at least partially. This may be effected by neutralizing or partially neutralizing the prepared monomers according to a), or by completely or partially neutralizing the monomers according to b) or d) which are to be dosed. However, in this connection it should be avoided to neutralize or partially neutralize the carboxylic acid-containing mono- mers during polymerization by simultaneously dosing into the reactor lyes and vinyl esters, since this results in premature saponification of the monomers under formation of acetaldehyde and brown-colored reaction products.

After termination of the polymerization, low-boiling components such as residual monomers or the hydrolysis products thereof are distilled off, if necessary, optionally under vacuum. The saponification of the monomers according to c) is carried out in acid or basic medium, pH values of less than 6.5 and more than 10 being preferred. Depending on the kind of monomer, the saponification is carried out at 60°–130° C. within 0.5 to 5 hours. In the polymer solution to be saponified the pH values required for saponification may be adjusted by the addition of solid, liquid, dissolved, or gaseous inorganic and organic acids or bases. Examples thereof include: sulfuric acid, hydrochloric acid, sulfur dioxide, toluene-p-sulfonic acid, sodium hydroxide solution, and potassium hydroxide solution. The readily volatile reaction products formed during the saponification may be separated by distillation, optionally under vacuum. A preferred embodiment is the alkaline saponification carried out without prior distillation of residual monomers and hydrolysis products in the presence of peroxides, whereby the still existing residual monomers and hydrolysis products are polymerized in situ or oxidized into harmless carboxylic acids. The degree of saponification of the saponifiable monomer units amounts to 1–100%, preferably 30–100%, and most preferably 60 to 100%. When the saponification is terminated, the aqueous polymer is adjusted to the pH value required for the respective application. To this end, the known agents, such as lyes and bases, mineral acids, carboxylic acids and polycarboxylic acids are used.

In principle, the polymerization may also be carried out as a suspension polymerization, whereby the aqueous monomer phase is dispersed by means of suspension stabilizers in an organic phase, which, for example may consist of cyclohexane, and is then polymerized and saponified in the form of this suspension. Subsequently, the water may be distilled off from the suspension azeotropically, and the solid polymer particles may easily be filtered off the organic phase and used after drying. Another possibility to manufacture powdery polymers is to spray-dry the polymer solution according to the present invention. For example, washing powders may directly be obtained by spray drying a common solution or suspension consisting of the polymer solutions according to the present invention and further detergent components.

The above-described polymers turn up in the molecular weight range of from 500 to 5,000,000, the low-molecular products having molecular weights of below 70,000 already being absolutely suitable for the use as cobuilders. It has become apparent in application technological examinations that the polymers according to the present invention in the molecular weight range of 20,000 and less develop an excellent action in detergents, and have a good dispersive power and suspending capacity. In addition, they are almost completely removed in the sewage-sludge-elimination-test.

The high-molecular polymers are suitable for other applications, e.g. as thickeners, auxiliaries in papermaking and in the water and wastewater treatment, or as additives for drilling fluids. In the production of the polymers, it has most surprisingly and in contrast to the findings of EP 497 611 A1, page 4, turned out to be advantageous to hydrolyze the maleic anhydride to a large extent or to neutralize the maleic acid prior to the polymerization. The polymers thus obtained exhibit surprisingly advantageous application technological properties in detergents and cleaners, and they are biodegradable.

The polymers according to the present invention - manufactured by solvent or suspension polymerization and saponification in the aqueous system - have a good to easy degradability and for that reason significantly differ from those manufactured according to the process of EP 0 497 611 A1 in organic solvents with subsequent saponification whose degradability is absolutely insufficient. Although the causes are yet unknown, a different arrangement of the monomers in the polymer chain - caused by the different polymerization processes - could, for example, have a decisive influence on the degradation behavior.

The production and properties of the polymers according to the present invention will be illustrated in greater detail in the following examples. Application-specific examinations demonstrate the efficiency of the polymers in the inhibition of water hardness (Ca and Mg-carbonate), as pigment dispersants, the $Ca^{2+}$ or $CaCO_3$-dispersing power and in a laundering test, as well as the biodegradability of the polymers according the present invention. In addition, the products according to the present invention have a good or excellent activity as auxiliary in the manufacture of leather if they are used - amongst others - in the processes of soaking, liming, in the washing processes after liming and in deliming, in particular in $CO_2$-deliming. Furthermore, they may advantageously be used in the tanning of leather, i.e. in pretanning, tanning and retanning. Additionally, the excellent biodegradability of the polymers according to the present invention is demonstrated in the examples.

Additionally, the products according to the invention are very suitable for the use in textile finishing processes, e.g. in the pretreatment of cotton, as additive in grey-cloth-washing, in the boiling off and kier scouring, as additive in textile fiber sizes, as stabilizer in peroxide bleaching, in dyeing processes of cellulose and synthetic fibers, e.g. to disperse oligomers, in textile printing as well as in washing off processes.

MANUFACTURING EXAMPLE

Example 1

63.8 g maleic anhydride in 260 g demineralized water and 93.6 g 50% sodium hydroxide solution are dissolved at 85° C. in a 2-I-glass-polymerization vessel provided with heating bath, stirrer, reflux condenser and metering devices for liquid and gaseous substances, and 3.5 mg iron(ll) ammonium sulfate are added. Within a period of 4 and 4.5 hours, two solutions are metered into the polymerization vessel. Solution 1 (4 hours) consists of 81.4 g acrylic acid, 42.1 g vinyl acetate and 100 g demineralized water; solution II (4.5 hours) consists of 18.7 g 35% hydrogen peroxide and 54 g water. At the end of the dosage of solution II the internal temperature has risen to 92° C.; at this temperature stirring is continued for one hour, and 11 g aqueous phase and 5 g vinyl acetate are withdrawn by means of a water separator. The polymer solution is cooled to 40° C., adjusted to pH 10 by means of sodium hydroxide solution and saponified at reflux for 60 minutes, then cooled and adjusted to pH 7.0 by means of hydrochloric acid. The dry solids amount to 30%, the polymer has a molecular weight of Mw=22,175. No ester bands can be detected in the IR-spectrum.

Example 2

In a polymerization batch manufactured according to the performance of Example 1, the following substance amounts are placed and metered respectively:

Preparation: 69.15 g maleic anhydride, 101.61 g 50% sodium hydroxide solution, 270 g demineralized water, 3.5 mg iron(ll)ammonium sulfate Solution I: 70.16 g acrylic acid, 60.2 9 vinyl acetate, 50 g water Solution II: 18.7 g 35% hydrogen peroxide, 100 9 demineralized water When the dosage of solution ll is completed, the product temperature amounts to about 86° C. At this temperature stirring is continued for a further hour; 10 g aqueous phase and 3 g vinyl acetate are distilled off by means of a water separator. The further processing of the polymer is carried out according to Example 1. The final product has a dry substance of 31.6%, the molecular weight amounts to about Mw=14,077, no ester groupings can be detected in the IR-spectrum.

Example 3

In a polymerization batch according to the test performance of Example 1, the following substance amounts are placed and metered respectively:

Preparation: 114.8 g maleic anhydride, 31 3.2 g demineralized water, 168.5 g 50% sodium hydroxide solution, 6.3 mg iron(ll)ammonium sulfate Solution I: 146.5 g acrylic acid, 45 g demineralized water, 65.1 g 50% sodium hydroxide solution, 35.4 g vinyl acetate Solution II: 33.7 g 35% hydrogen peroxide, 2 g sodium peroxodisulfate, 300 g demineralized water After completing the dosage of solution ll the product temperature amounts to about 92° C. Stirring is continued for a further hour at this temperature; 21.5 g aqueous phase is distilled off by means of a water separator. The further processing of the polymer is carried out according to Example 1. The final product has a dry substance content of 33.1 % and a molecular weight of Mw=18,343.

Example 4

The polymerization batch of Example 1 is repeated with the following changes:

Solution II: 119 g demineralized water, 13.17 g sodium peroxodisulfate

Solution III: 123 g demineralized water, 2.5 g sodium disulfite.

During the dosage of solutions I–III the product temperature amounts to 65° C., then stirring is continued for one hour at 90° C. During distillation only one aqueous phase settles down; vinyl acetate is not present. The further processing of the product is carried out according to Example 1.

The final product has a content of solids of 31 % and a viscosity of 180 mPa.s.

Example 5

In a polymerization batch according to the test performance of Example 1, the following substances are placed and dosed respectively:

Preparation: 63.8 g maleic anhydride, 1 74 g demineralized water, 93.6 g 50% sodium hydroxide solution, 3.5 mg iron(ll)ammonium sulfate Solution I: 81.4 g acrylic acid, 42.1 g vinyl acetate, 100 g demineralized water Solution II: 18.7 g 35% hydrogen peroxide, 144 g demineralized water After completion of the solution II dosage the internal temperature of the reactor amounts to 90° C. At this temperature stirring is continued for one hour; 14 g water and 5 g vinyl acetate are distilled off by means of a water separator. The further processing of the polymer is carried out according to Example 1. The final product has a solids content of 31 % and a molecular weight of Mw=30,200.

Example 6

In an agitated pressurized reactor of stainless steel, 144.8 g maleic anhydride in 308.0 g demineralized water and 212.6 g 50% sodium hydroxide solution are dissolved at 85° C., and 6.3 mg iron(ll)ammonium sulfate are added. The reactor is purged with nitrogen, closed and heated to 90° C. Subsequently, two solutions (I and II) are dosed into the reactor within 4 and 4.5 hours respectively; after termination of the dosage stirring is continued at 90° C. for one hour. Solution I comprises 124 g acrylic acid, 37 g demineralized water, 55.1 g 50% sodium hydroxide solution, and 75 g vinyl acetate.

Solution II comprises 33.7 g 35% hydrogen peroxide, 2 g sodium peroxodisulfate, and 205.8 g demineralized water. At the end of the dosage of solution ll the internal pressure of the reactor amounts to 3.8 bar. After cooling, 32.5 g water are distilled off from the reactor batch by means of a water separator; vinyl acetate is no longer present. For saponification purposes, the product is adjusted to pH 10.5 by means of sodium hydroxide solution, refluxed for 1 hour and then neutralized with hydrochloric acid. The dry substance content of the polymer amounts to 35.9%.

Example 7

Example 6 is repeated with the following changes:

The iron salt is omitted from the premixture and the reactor is not purged with nitrogen. Solution ll is changed as follows: 25 g sodium persulfate in 205.8 g demineralized water. After the end of the dosage of solution ll a pressure of 3.5 bar has built-up in the reactor. The further processing of the product is carried out in accordance with Example 6. 5 g vinyl acetate turn up in the distillation step. The polymer has a dry substance of 37.6%.

Example 8

Polymerization is carried out in accordance with Example 6 in a pressurized reactor at 90° C., purging with nitrogen does not take place and the amounts used are as follows:

Preparation: 176.4 g maleic anhydride, 372.1 g demineralized water, 259.2 g 50% sodium hydroxide solution Solution ll: 100.8 g acrylic acid, 48.6 g vinyl acetate, 45 g 50% sodium hydroxide solution, 30 g demineralized water Solution II: 33.7 9 35% hydrogen peroxide, 171.0 9 demineralized water.

After termination of the solution 11 dosage a pressure of 3.2 bar has built-up. The further processing of the product is effected as in Example 6.

The polymer has a dry substance of 34.5% and a molecular weight of Mw=11,100.

Example 9

Polymerization is carried out in accordance with Example 6 in a pressurized reactor at 90° C., nitrogen purging is not effected and the amounts used are as follows:

Preparation: 113.4 g maleic anhydride, 248.8 g demineralized water, 166.7 g 50% sodium hydroxide solution, 6.3 mg iron(ll)-ammonium sulfate Solution I: 34.9 g vinyl acetate, 45.0 g demineralized water, 145.8 g acrylic acid Solution II: 33.6 g 35% hydrogen peroxide, 232 g demineralized water.

Nitrogen gassing is not carried out.

After termination of the solution ll dosing a pressure of 2.6 bar has adjusted. The further processing of the product is effected as in Example 6.

The polymer has a dry substance of 36.6% and a molecular weight of Mw=21,480.

Example 10

In a 2-l-glass-polymerization vessel 313.2 g demineralized water, 114.8 g maleic anhydride, and 168.5 g 50% sodium hydroxide solution are mixed at 65° C under stirring, and then 35.4 g vinyl acetate are added.

Subsequently, three solutions are dosed into the reactor at 65° C. within 2.5 hours:

Solution I: 146.5 g acrylic acid, 180 g demineralized water

Solution II: 22.3 g sodium peroxodisulfate, 141.4 g demineralized water

Solution III: 4.3 g sodium disulfite, 100.6 g demineralized water

After dosing the temperature is maintained for one hour, followed by one further hour at 90° C. Subsequently, saponification and neutralization of the product is carried out as in Example 1.

The polymer has a dry substance of 31.4% and a viscosity of 670 mPa.s, the molecular weight amounts to Mw=132,000.

Example 11

The performance of this test is carried out in accordance with Example 10, except for the amount of 17.7 g vinyl acetate. During polymerization and saponification there is no release of carbon dioxide. The final product has a content of solids of 30.7% and a viscosity of 295 mPa.s.

Example 12

In a polymerization batch according to the test performance of Example 1, the following substances are placed and dosed respectively:

Preparation: 63.8 g maleic anhydride, 260 g demineralized water, 52 g 50% sodium hydroxide solution, 3.5 mg iron(ll)ammonium sulfate Solution I: 81.4 g acrylic acid, 22 g demineralized water, 45.1 g 50% sodium hydroxide solution, 42.1 g vinyl acetate, Solution II: 18.7 g 35% hydrogen peroxide, 128.4 g demineralized water.

After solution II has been dosed stirring is continued for one hour at 85° C.; 10.1 g water and 2.7 g vinyl acetate are distilled off by means of a water separator. The further processing of the polymers is carried out according to Example 1.

The final product has a dry content of 30.3% and a viscosity of 45 mpa.s, the molecular weight amounts to Mw=11,160.

Example 13

Example 6 is repeated with the following changes:

Solution I consists of 124 g acrylic acid, 30 g demineralized water, 55.1 g 50% sodium hydroxide solution and 117.97 g vinyl acetate. No purging with nitrogen is carried out.

At the end of the dosage of solution ll the internal pressure of the reactor has risen to 4.7 bar. The dry substance amounts to 36.7%, the molecular weight amounts to Mw=17,275.

Example 14

Polymerization is carried out in accordance with Example 6 in a pressurized reactor at 90° C., purging with nitrogen is not effected and the amounts used are as follows:

Preparation: 220 g demineralized water, 127.9 g 50% sodium hydroxide solution, 87.1 g maleic anhydride Solution I: 166.4 g acrylic acid, 80 g demineralized water, 73.9 g 50% sodium hydroxide solution, 30.6 g vinyl acetate Solution II: 210 g demineralized water, 33.7 g 35% hydrogen peroxide, 2 g sodium peroxodisulfate After termination of the solution ll dosage a pressure of 1.7 bar has built up. The further processing of the product is effected as in Example 6. The polymer has a dry substance of 34.7% and a viscosity of 320 mpa.s.

Comparative Example 1

This comparative example describes the manufacture of a saponified terpolymer of maleic anhydride, acrylic acid, and vinyl acetate according to the process of EP 0 497 611 A1. The monomer composition corresponds to that of Example 1 of the present invention.

In an agitated polymerization reactor, 225 g methyl ethyl ketone are blown out with nitrogen, heated to 80° C., and 0.45 g t-butyl peroxypivalate (75%) are added thereto.

Then, three solutions are dosed within two hours:

Solution I: 42.1 g vinyl acetate, 63.8 g maleic anhydride, 81.4 g acrylic acid

Solution II: 7 g t-butyl peroxypivalate, 9 g methyl ethyl ketone

Solution III: 4.1 g mercaptoacetic acid, 9 g methyl ethyl ketone

After termination of the dosage stirring is continued for one hour at 80° C. followed by distilling off methyl ethyl ketone.

In a second process step, 10 g of the resultant polymer in 40 g water and 10.3 g 50% sodium hydroxide solution are refluxed overnight and then adjusted to pH 7 with glacial acetic acid. Subsequently, the solution is gradually added dropwise into 400 ml ethanol, whereby the polymer precipitates. Rewashing with ethanol and drying of the polymer is effected.

Comparative Example 2

Comparative Example 2 describes the production of a maleic acid/vinyl alcohol copolymer which is recommended to the used in detergent formulations in GB 1,284,815. It demonstrates that the calcium carbonate dispersive power of such polymers which is an important characteristic for detergents is considerably poorer than that of the terpolymers according to the present invention.

In a polymerization reactor, 330 g demineralized water, 98 g maleic anhydride, and 80 g 50% sodium hydroxide solution are dissolved at 80° C. and blown out with nitrogen. It is cooled to 65° C., 68.9 g vinyl acetate are added, and two solutions are dosed into the reactor within 2.5 hours. Solution l consists of 36.8 g sodium persulfate, dis- solved in 70 g demineralized water, and solution ll consists of 7.0 g sodium disulfite and 30 g demineralized water. After termination of the dosage the temperature is increased to 88° C. within 2.5 hours followed by saponification of the acetate groups with sodium hydroxide solution at pH 11 under reflux conditions within one hour and subsequent neutralization with hydrochloric acid. The final product has a content of solids of 36.1 %, a pH of 7.9 and a viscosity of 49 mPa.s.

Example 15

206.6g maleic anhydride, 563.7 g distd. water, and 303.3 g 50% sodium hydroxide solution are dissolved at 88° C. in a glass polymerization reactor and then 11.3 mg iron-ll-ammonium sulfate are added. Subsequently, 2 solutions are metered thereto. Solution I consists of 263.7 g acrylic acid, 81 g distd. water, 117.1 g 50% sodium hydroxide solution, and 63.7 g vinyl acetate and is added within 4 hours. Solution II consists of 60.7 g 35% hydrogen peroxide, 3.6 g sodium peroxodisulfate, and 540 g water and is added within 4.5 hours. At the end of the dosage the temperature amounts to 92° C. and is maintained for 15 minutes. Then 42.8 g distillate is separated. pH 10 is adjusted with sodium hydroxide solution; saponification is carried out for one hour at reflux and neutralization is effected with hydrochloric acid. The polymer has a solids content of 31.5% and a viscosity of 90 mPas, the calcium carbonate dispersing power amounts to 234 mg $CaCO_3$/g dry substance. The average molecular weight amounts to Mw=21,690 and the molecular weight at peak maximum of the distribution curve amounts to Mp=7,860.

Example 16

In a glass polymerization reactor, 114.8 g maleic anhydride are dissolved in 283.2 g distd. water and 168.5 g 50% sodium hydroxide solution at 85° C., 6.3 mg iron-ll-ammonium sulfate are added thereto.

Within 4 hours, a solution of 146.5 g acrylic acid, 45 g distd. water, 65.1 g 50% sodium hydroxide solution, and 36.2 g ethylene glycol monovinyl ether and a solution of 33.7 g 35% hydrogen peroxide and 2 g sodium persulfate in 50 g distd. water are added dropwise. During this addition the product temperature rises from 88° C. to 92° C. and is maintained for 30 minutes after the end of the dosage. Then a pH of 4 is adjusted with sulfuric acid, the mixture is refluxed for one hour and neutralized with sodium hydroxide solution. The polymer has a content of solids of 40.8% and a calcium carbonate dispersive power of 283 mg $CaCO_3$/g dry substance.

Example 17

A polymer according to the composition of Example 15 is produced with the modification that ethylene glycol monovinyl ether is not dosed but added to the premixture. The polymer had a dry substance content of 30.2% and a calcium carbonate dispersive power of 330 mg $CaCO_3$/g dry substance.

Example 18

In a glass polymerization reactor 114.8 g maleic anhydride, 130 g distd. water, and 168.5 g 50% sodium hydroxide solution are commonly dissolved at 88° C. and 12.6 mg iron-ll-ammonium sulfate are added. Two solutions are dosed into the reactor preparation within a period of 4 hours. Solution I consists of 146.5 g acrylic acid, 45 g distd. water, 65.1 g sodium hydroxide solution, and 35.4 g vinyl acetate, solution ll consists of 67.4 g 30% hydrogen peroxide, 4.0 g sodium persulfate, and 21.3 g distd. water. After the end of the dosage stirring is continued for 30 min. at 90° C. and 33.9 g distillate is separated afterwards. Subsequently, saponification is carried out with sodium hydroxide solution and neutralization with sulfuric acid. The polymer has a dry substance content of 48.6% and a viscosity of 2,680 mPas. The average molecular weight amounts to Mw=15,100, the molecular weight at the peak maximum in the distribution curve is Mp=5,200; the calcium carbonate dispersive power amounts to about 314 mg $CaCO_3$/g dry substance. The residual content of maleic acid amounts to 190 ppm and that of acrylic acid to 65 ppm, vinyl acetate is below the detection limit of 0.1 ppm.

Example 19

The polymerization batch according to Example 18 is modified such that only 2.0 g sodium persulfate are used. The polymer has a solids content of 48.6% and a viscosity of 2,540 mPas; the average molecular weights amount to Mw=19,700 and Mp=8,700. The residual monomer content of maleic acid amounts to 0.1 %, of acrylic acid to 65 ppm, and that of vinyl acetate <0.1 ppm, acetaldehyde is present with 3 ppm.

Example 20

In a glass polymerization reactor, 114.8 g maleic anhydride, 31 3.2 g distd. water, and 168.5 g 50% sodium hydroxide solution are dissolved at 85° C.; 6.3 mg iron-ll-ammonium sulfate are added. A solution of 146.5 g acrylic acid, 45 g distd. water, 65.1 g 50% sodium hydroxide solution, and 35.4 g vinyl acetate is added within 4 hours, and a solution of 33.7 g 35% hydrogen peroxide, 2.0 g sodium persulfate and 50 g water is dosed within 4.5 hours. During the dosage the temperature rises to 96° C. After a holding time of 0.5 hour at 90° C., pH 10 is adjusted with sodium hydroxide solution and 19.8 g 35% hydrogen peroxide are added; saponification is effected for 1 hour at reflux and neutralization is carried out with hydrochloric acid. The polymer has a dry substance content of 37.2% and a viscosity of 250 mPas. The molecular weight Mw amounts to 19,400, and Mp amounts to about 6,500. The residual monomer content of vinyl acetate amounts to <10 ppm and that of acetaldehyde to 22 ppm.

Example 21

In a polymerization reactor of V4A-steel, 114.8 g maleic anhydride, 283.2 g distd. water, and 168.5 g 50% sodium hydroxide solution are dissolved at 88° C., 6.3 mg iron-ll-ammonium sulfate are added thereto. Within a period of 4 hours 2 solutions are dosed. Solution I consists of 146.5 g acrylic acid, 45 g distd. water, 65.1 g 50% sodium hydroxide solution, and 35.4 g vinyl acetate. Solution II comprises 33.7 g 35% hydrogen peroxide, 2.0 g sodium persulfate, and 50 g distd. water. At the end of the dosage the product temperature amounts to 92° C., at this temperature stirring is continued for 0.5 h. Then 34 g distillate is removed and 0.5% sulfur dioxide is supplied at 75° C., allowed to stand at this temperature for 1 hour followed by neutralization with sodium hydroxide solution. The polymer has a residual monomer content of 50 ppm maleic acid, <10 ppm acrylic acid, and <0.1 ppm vinyl acetate. The calcium carbonate dispersive power amounts to 320 mg $CaCO_3$/g dry substance.

Example 22

In a polymerization reactor of V4A-steel, the following substances are dissolved with one another at 88° C.: 114.8 g maleic anhydride, 283.2 g water, 168.5 g 50% sodium hydroxide solution, and 6.3 mg iron-ll-ammonium sulfate. Two solutions are metered thereto within a period of 4 hours. Solution I comprises: 146.5 g acrylic acid, 45 g distd. water, 65.1 g sodium hydroxide solution, and 35.4 g vinyl acetate. Solution II comprises: 67.4 9 35% hydrogen peroxide, 2.0 g sodium persulfate, and 21.3 g distd. water. After dosing, stirring is continued for 30 min. and 10.5 g distillate removed, followed by alkaline saponification with sodium hydroxide solution and neutralization with sulfuric acid. The polymer has a content of solids of 40.4% and a viscosity of 320 mpas. The calcium carbonate dispersing action amounts to 290 mg $CaCO_3$/g dry substance, the mean molecular weight Mw amounts to 11.700 and the molecular weight at the peak maximum of the distribution curve Mp=3,500. The residual monomer content of maleic acid amounts to 0.7%, of acrylic acid to 0.08%, of vinyl acetate to <0.1 ppm, and that of acetaldehyde to 4 ppm.

Example 23

A polymer according to the monomer composition of Example 1 was heated to 40° C. and sprayed by a spray nozzle in a spray dryer. The drying conditions at the inlet of the spray dryer were 170° C. and at the outlet 110° C. The polymer powder had a white color, was free-flowing, had a low dust content and a bulk density of 710 g/l; the main fraction of the powder particles was between 100 and 200 µ. The good dispersing properties of the polymer were not changed by spray drying.

Example 24

In a glass polymerization reactor 114.8 g maleic anhydride, 283.2 g distd. water, 168.5 g 50% sodium hydroxide solution, and 12.6 mg iron-ll-ammonium sulfate were dissolved at 85° C. Then, dosage is started with a solution of 50.6 g hydrogen peroxide (35%), 4.0 g sodium persulfate, and 35 g distd. water over a period of 4.5 hours, and with a solution of 146.5 g acrylic acid, 45 g water, 65.1 g sodium hydroxide solution (50%), and 35.4 g vinyl acetate over a period of 4 hours. During dosing the temperature in the reactor rises to 90° C. After termination of the dosage a temperature of 90° C. is maintained for a period of 1.5 hours, followed by removal of distillate, cooling and neutralization with sodium hydroxide solution. The polymer has a solids content of 40% and a viscosity of 480 mPas.

Example 25

In a glass polymerization reactor, 300 g polymer of Example 20, 80.4 g maleic anhydride, 168.5 g sodium hydroxide solution (50%) are dissolved at 85° C. and 4.0 mg iron-ll-ammonium sulfate are added. A solution of 146.5 g acrylic acid, 45 g distd. water, 61.1 g sodium hydroxide solution (50%), and 35.4 g vinyl acetate is dosed within 4 hours, and a solution of 33.7 g 35% hydrogen peroxide, 2.0 g sodium persulfate, and 50 g distd. water is dosed within 4.5 hours. After termination of the dosage stirring is continued for one hour at 90° C., 75 g distillate is removed, pH 10.5 is adjusted with sodium hydroxide solution, 19.8 g hydrogen peroxide (35%) is added, followed by refluxing for 1 hour and neutralization with sulfuric acid. The solids content of the polymer amounts to 42.1 %, the viscosity amounts to about 980 mPas, the calcium carbonate dispersive power amounts to 270 mg $CaCO_3$/g dry substance.

Example 26

Biodegradability Test

A. The biodegradability according to the modified STURM-Test was tested with the polymers according to Example 1, 2, and 15. The course of the degradation was as follows:

|  | % Biological degradation | | |
|---|---|---|---|
| Test period | Example 1 | Example 2 | Example 15 |
| 30 min. | 1 | 1 | — |
| #3 days | 5 | 6 | 18 |
| 7 days | 5 | 6 | 24 |
| 12 days | 30 | 11 | 39 |
| 17 days | 66 | 45 | — |
| 18 days | — | — | 54 |
| 21 days | 71 | 46 | 59 |
| 26 days | — | — | 70 |
| 28 days | 84 | 88 | 76 |

B. In a further test according to the OECD 303A-standard the elimination of the polymer in the presence of sewage sludge was examined. The reduction of the dissolved carbon content within 28 days was checked. The elimination after 28 days amounted to 99% with the polymer according to Example 15. This result demonstrates an excellent eliminability of the polymers according to the present invention in the presence of sewage sludge.

C. Biodegradation (another degradation test according to the composting process):

The controlled composting biodegradation test (ASTM D 5338/92) is an optimized simulation of an intensive aerobic composting process where the biodegradability of a test substance under dry aerobic conditions is determined. The inoculum consists of stabilized and mature compost derived from the organic fraction of municipal solid waste. The test substance is mixed with the inoculum and introduced into a static reactor vessel where it is intensively composted under optimum oxygen, temperature and moisture conditions.

During the aerobic biodegradation the carbon dioxide production is monitored. The percentage of biodegradation can be calculated as the percentage of solid carbon of the test compound which has been converted to gaseous, mineral C under the form of $CO_2$.

| Sample | % Biodegradation |
|---|---|
| Example 1 | 66 |
| Example 2 | 68 |
| Example 20 | 89 |
| Cellulose | 88 |

Examples relating to Application Technology

Example 27

Manufacture of Leather

In the following it is demonstrated that the polymers according to the present invention are suitable for the leather manufacture; the retannage of upper leather is used as example. The softness of the leather, the grain tightness and the fullness are used as assessment criteria. The polymer according to Example 1 was tested in comparison with a commercial retanning agent based on polyacrylic acid. The results are as follows:

|  | Polymer according Example 1 | Commercial Polymer |
|---|---|---|
| Softness * | 3–4 | 3–4 |
| Grain tightness * | 3 | 2–3 |
| Fullness | 2.1 mm | 2.0–2.1 mm |

* The assessment order is 1–6, 1 representing the best assessment.

Example 28

Determination of the calcium-carbonate-dispersive-action

A main property characteristic of cobuilders in detergents and cleaners is the capability to prevent slightly soluble precipitations of alkaline-earth or heavy metal salts which, for example, cause incrustations on clothes. To determine the calcium carbonate dispersive power (CCDP) [according to Richter Winkler in Tenside Surfactants Detergents 24, (1987) pp 213–216] the following procedure was chosen:

1 g product is dissolved in 100 ml distd. water, and 10 ml 10% sodium carbonate solution are added. A pH of 11 is adjusted with sodium hydroxide solution, and titration is effected with 0.25 ml calcium acetate solution until a first permanent turbidity occurs. The CCDP is indicated in mg $CaCO_3$/g dry substance.

| Example No. | CCDP [mg $CaCO_3$/g dry substance] |
|---|---|
| 1 | 273 |
| 2 | 239 |
| 3 | 248 |
| 4 | 216 |
| 5 | 220 |
| 6 | 228 |
| 7 | 244 |
| 8 | 201 |
| 9 | 238 |
| 10 | 277 |
| 11 | 275 |
| 12 | 196 |
| 13 | 212 |
| 14 | 236 |
| 15 | 234 |
| 16 | 283 |
| 17 | 330 |
| 18 | 314 |
| 21 | 320 |
| 22 | 290 |
| Comparative Example 1 | 135 |
| Comparative Example 2 | 129 |
| Commercial product (based on maleic acid/ acrylic acid) | 258 |

Based on the Comparative Examples it is shown that both the polymers manufactured according to EP 0 497 611 A1 and known copolymers have a poorer $CaCO_3$-dispersive power than the products according to the present invention.

Example 29
Determination of the resistance to hard water

A certain amount of a 10% polymer solution is added to a test water having 33.6°dH [=German water hardness] (pure calcium hardness), boiled on a heating plate for 5 minutes and subsequently judged visually with respect to clarity, opalescence and turbidity. By varying the amount of copolymer, the concentration of gram of product (dry substance) per liter of hard water is determined, i.e., the concentration at which after previous turbidity/opalescence a clear solution results for the first time.

The results clearly demonstrate that the polymers according to the present invention can provide an effective inhibition of boiler scale or similar deposits and that precipitations of components of the hard water can be prevented.

| Product Example | Hard water resistance clear at (g solids/l) |
|---|---|
| 1 | 1.5 |
| 2 | 1.5–2.0 |
| 3 | 2.0–2.5 |
| 5 | 2.0 |
| Lavoral S 312 (Commercial product of Chemische Fabrik Stockhausen GmbH, based on polyacrylic acid) | 1.5–2.0 |
| Commercial product based on maleic acid/ acrylic acid copolymer | 2.0 |

Example 30
Laundering test

The deterging efficiency of the polymers according to the present invention was tested with a cotton fabric. In the washing test with said test fabrics the polymers were used as a component in a phosphate-free washing formulation. For evaluation purposes, the ash content of the test fabrics was determined after 10 wash cycles and put in relation to the ash content of test fabrics in laundering tests without polymer addition. The quotient of the reduced ash with added polymer to the ash content without added polymer is a measure for the incrustation-inhibiting action of the polymer. A commercial copolymer of 70% acrylic acid and 30% maleic acid was used as comparison. The washing formulation was built up as follows:

```
7.0% LAS
2.0% ethoxylated C13/C15-alcohol (7 mole EO)
2.0% soap
3.0% sodium silicane
27.0% zeolite A
1.0% carboxymethylcellulose
10.0% sodium carbonate
18.0% sodium sulfate
20.0% sodium perborate
4.0% polymer (Example 1 or commercial product)
      dry substance
3.0% water
```

| Polymer | Incrustation inhibition * |
|---|---|
| Example 1 | 0.51 |
| Commercial product | 0.49 |

* The range of assessment amounts to: 0–1, 1.0 means complete prevention of incrustation (ash deposition) on the fabric, 0 means no ash reduction by addition of the polymer The result of the washing tests demonstrates that the polymers according to the present invention have a good incrustation-inhibiting action in the phosphate-free detergents and that their action is comparable or superior to that of the commercial polymer.

Example 31
Measurement of the hydrophilic suspending capacity

The anti-redeposition power of detergent builders may be characterized by determining the hydrophilic suspending capacity. The capacity to suspend pulverized iron oxide is regarded as the measure for the soil-carrying capacity. The suspending capacity is determined by photometric turbidity measurement of a suspension consisting of the test substance, an iron oxide pigment and the surfactant MARLON A (alkylbenzene sulfonate by Hüls AG, Mari, FRG). In a shaking cylinder, the iron oxide in an aqueous solution of the test substance is vigorously shaken under addition of MARLON A, after 24 hours the intensity of the then still existing turbidity is determined photometrically. The extinction $E_{450}$ at 450 nm in a cuvette of 1 cm is measured.

The determined extinction values represent the measure for the hydrophilic suspending capacity. Products having a high suspending activity stabilize the pigments in the aqueous phase and have high extinction values.

| Product | Extinction $E_{450}$ |
|---|---|
| Polymer according to Example 21 | 40 |
| Commercial maleic acid/ acrylic acid copolymer | 6 |

The result demonstrates a very high hydrophilic suspending capacity for the polymers according to the present invention, whereas a com- mercial polymer used as cobuilder in the detergent industry exhibits considerably poorer results.

Example 32
Measurement of the inhibition of calcium salt and magnesium salt deposits It is tested whether the crystal growth in a water cycle may be inhibited by the addition of copolymeric polycarboxylates, thus preventing deposits of carbonates.

A test water comprising calcium and magnesium bicarbonate in dissolved form (5.36 mmol $Ca^{2+}$/l, 1.79 mmol $Mg^2$, 10 mmol $CO_3^{2-}$/l) is mixed with 5 ppm copolymer and lead through the heated (75° C.) glass spiral of a Dimroth-condenser at a constant flow rate. Usually calcium and magnesium carbonate deposits form in the glass spiral. These are then removed by means of an acid and determined complexometrically. The deposits formed with and without copolymer are then put in relation to one other.

| Polymer | Residue in condenser in mg | | %-inhibition | |
|---|---|---|---|---|
| | Ca | Mg | Ca | Mg |
| without | 57 | 36 | — | — |
| Example 1 | 9 | 6 | 84 | 83 |
| Example 15 | 10 | 8 | 82 | 78 |
| Example 20 | 7 | 5 | 88 | 86 |
| Commercial maleic acid/ acrylic acid copolymer | 11 | 9 | 80 | 75 |

The copolymers according to the present invention exhibit a good inhibition behavior with respect to calcium and magnesium carbonate salts. This property shows to advantage, for example, in washing processes and in cooling-water-circulations. Maleic acid/acrylic acid copolymers show a poorer inhibition behavior.

Example 33
Dispersing tests

In order to demonstrate the dispersing action of the copolymers according to the present invention on pigment suspensions, talcum (Finntalc C10 by OMYA) was stirred into aqueous copolymer solutions of pH 12 until a pigment content von 66% was achieved, the viscosity was measured immediately and after 7 days; the stirrability was graded with 1–6. The combination of POLYSALZ S/LUMITEN P-T (by BASF AG) was used as state of the art. The addition of the dispersing agent amounted to 0.2%/abs. dry pigment, and in the case of POLYSALZ/LUMITEN concentrations usual in practice were used: 0.15/1.0%/ abs. dry pigment.

| Dispersant | Slurry viscosity (mPas, Brookf., 100 rpm) immediately | 7 days | Stirrability 1: very good 6: very bad |
|---|---|---|---|
| Example 1 | 440 | 210 | 3 |
| POLYSALZ S/ LUMITEN PT | 280 | 340 | 3 |

Example 34
Use of the polymers of Example 22 of the present invention as bleaching stabilizers
A. Bleaching of raw fibers

| Recipe: | | |
|---|---|---|
| 1.0 g/l | Sultafon UNS neu |
| 0.8 g/l | magnesium chloride |
| 5.0 g/l | polymer of Example 22 |
| 15.0 ml/l | NaOH, 50% |
| 35.0 ml/l | hydrogen peroxide, 35% |

Steeping liquid is prepared; the recipe components are added under stirring in the order given above.

Prior to the addition of sodium hydroxide solution (50%) and hydrogen peroxide (35%), the polymer is dissolved in water.

Process steps in accordance with a continuous pad steam machine:
Impregnating the goods with the bleaching liquor impregnating compartment, speed of goods 20 m/min.
Expressing to 70–80% liquor pickup web squeezer
Steaming, saturated steam 98° C., 20 min. closed steamer
Washing off via 4 wash boxes
1st wash box: 90° C.
2nd wash box: 60° C. 1–2 ml/l Solopol POE (peroxide eliminator)
3rd wash box: 40° C.
4th wash box: cold
Drying
Performance in laboratory test: Impregnating on the padder, liquor pickup 81.5% Pressure of padding roller: 1.8 bar
Steaming with saturated steam at 98° C., 20 min.
Hot and cold washing off, 10 min. each
Drying
Degree of whiteness achieved: 81.5% measured with Elrepho-appartus, filter 7

(Sultafon UNS neu and Solopol POE are commercial products of Stockhausen GmbH)

B. Effect of water hardness on the stabilizing capacity of the polymer according to Example 22 in bleaching liquors

| Recipe: | |
|---|---|
| 1.0 g/l | Sultafon UNS neu |
| x g/l | magnesium chloride to adjust the water hardness |
| 3.5 g/l | polymer according to Example 22 |
| 9.2 g/l | NaOH, 50% |
| 35.0 ml/l | hydrogen peroxide, 35% |

Temperature of test: 80° C.
Duration of test: 180 min.
Tester: Zeltex
Titration preparation: 10 ml
Titrating agent: 0.1 n potassium permanganate solution

| | at 16° dH | | at 20° dH | |
|---|---|---|---|---|
| Time in min. | $H_2O_2$ amount in ml present in bath | Percent | $H_2O_2$ amount in ml present in liquor | Percent |
| 0 | 36.2 | 100.0 | 35.3 | 100.0 |
| 30 | 30.8 | 85.1 | 32.9 | 93.3 |
| 60 | 29.2 | 80.8 | 31.7 | 89.8 |
| 90 | 28.2 | 77.9 | 29.9 | 84.7 |
| 120 | 25.9 | 71.5 | 27.1 | 76.8 |
| 150 | 25.0 | 69.0 | 26.1 | 74.0 |
| 180 | 24.5 | 67.7 | 18.8 | 67.7 |

Example 35
Laundering tests in a phosphate and zeolite-free formulation

The excellent detergent action of the polymers according to the present invention is demonstrated in further laundering tests using detergent recipes without phosphate and zeolite. A commercial copolymer of maleic acid/acrylic acid (30/70%-wt.) was used as comparison. A cotton test fabric was washed at 95° C. with water of 13°dH in domestic washing machines and examined with respect to brightening and incrustation after 12 wash cycles. The detergent recipe had the following composition:

6% alkylbenzene sulfonate
5% C13-fatty alcohol ethoxylate (7 mol EO)
5% powder soap
25% sodium carbonate
4% sodium sulfate
15% sodium perborate
25% sodium bicarbonate
5% sodium metasilicate
10% copolymer (100%)

| Polymer | % brightening | % residual ash |
|---|---|---|
| Example 22 | 86 | 0.4 |
| Commercial product | 86 | 0.85 |
| without | 58 | 1.35 |

Accordingly, the polymers according to the present invention have an excellent detergent action and are clearly superior to the copolymers based on acrylic acid/maleic acid.

We claim:

1. Biodegradable polymers suitable for the use in detergents and cleaning agents obtained by radical polymerization of the following monomers (a), (b), (c) and optionally (d), wherein prior to polymerization the monomers containing carboxylic acid groups have been at least partially neutralized to form salts thereof:
   a) monoethylenically unsaturated dicarboxylic acids,
   b) monoethylenically unsaturated monocarboxylic acids,
   c) monoethylenically unsaturated monomers which, after hydrolysis or saponification, have one or several hydroxyl groups covalently bonded to the C-C-chain and,
   d) different, radically copolymerizable monomers, followed by hydrolysis or saponification of the polymerized monomer units c) to form hydroxyl groups covalently bonded to the C-C-chain of the polymer in aqueous medium, the polymers exhibiting a biological degradation rate of greater than or equal to 60% Biological Oxygen Demand after 28 days.

2. The biodegradable polymers suitable for detergents and cleaners according to claim 1 comprising
   a) 10–70%-wt. of monoethylenically unsaturated $C_{4-8}$ dicarboxylic acids,
   b) 20–85%-wt. of monoethylenically unsaturated $C_{3-10}$ monocarboxylic acids,
   c) 1–50%-wt. of monounsaturated monomers which, after hydrolysis or saponification, have one or more hydroxyl groups covalently bonded to the C-C-chain, and
   d) 0.–10%-wt. of different radically copolymerizable monomers, with the sum of the monomers according to a) to d) amounting to 100%, and wherein said carboxylic acids are at least partially neutralized.

3. The biodegradable polymers suitable for detergents and cleaners according to claim 1 comprising
   a) 20–60%-wt. monoethylenically unsaturated $C_{4-8}$ dicarboxylic acids,
   b) 25–60%-wt. monoethylenically unsaturated $C_{3-10}$ monocarboxylic acids,
   c) 4–40%-wt. monounsaturated monomers which, after hydrolysis or saponification, can be converted to monomer units with one or more hydroxyl groups covalently bonded to the C-C-chain, and
   d) 0–10%-wt. of different radically copolymerizable monomers, with the sum of the monomers according to a) to d) amounting to 100%, and wherein said carboxylic acids are at least partially neutralized.

4. The biodegradable polymers suitable for detergents and cleaners according to claim 1, wherein said polymers comprise as monomer component a) maleic acid, itaconic acid, and fumaric acid, that they comprise as monomer component b) acrylic or methacrylic acid, and that they comprise as monomer component c) vinyl acetate, vinyl propionate, ethylene glycol monovinyl ether, and/or methyl vinyl ether and wherein said carboxylic acids are at least partially neutralized.

5. The biodegradable polymers suitable for detergents and cleaners according to claim 1, wherein said polymers have a biological degradation rate of $\geq 80\%$ Biological Oxygen Demand after 28 days.

6. A process for producing biodegradable polymers suitable for the use in detergents and cleaners of
   a) monoethylenically unsaturated dicarboxylic acids and/or the salts thereof,
   b) monoethylenically unsaturated monocarboxylic acids and/or the salts thereof,
   c) monoethylenically unsaturated monomers which, after hydrolysis or saponification, are converted into monomer units having one or several hydroxyl groups covalently bonded to the C-C-chain, and
   d) optionally further, radically copolymerizable monomers, comprising at least partially neutralizing the acid monomers a), b) and optionally d) radically polymerizing the monomers a) to d), and hydrolyzing or saponifying the polymerized monomer units c) in aqueous medium into hydroxyl groups covalently bonded to the C-C-chain of the polymer, the polymers having a biological degradation rate of greater than or equal to 60% Biological Oxygen Demand after 28 days.

7. The process for the production of biodegradable polymers suitable for detergents and cleaners according to claim 6 wherein the polymerization is carried out in aqueous solution at 40°–180° C.

8. The process for the production of biodegradable polymers suitable for detergents and cleaners according to claim 6, wherein the dicarboxylic acids and at least a partial amount of the hydrolyzable or saponifiable monomer are placed in the reaction vessel together and the remaining monomers are added during the polymerization, and that the polymerization is optionally carried out in a closed polymerization reactor.

9. The process for the production of biodegradable polymers suitable for detergents and cleaners according to claim 6, wherein dicarboxylic acids are used which are obtained from dicarboxylic acid anhydrides by hydrolysis prior to polymerization and partial neutralization.

10. The process for the production of biodegradable polymers suitable for detergents and cleaners according to claim 6, wherein maleic acid, itaconic acid, and fumaric acid or the salts thereof are used as monomer component a), acrylic or methacrylic acid or the salts thereof are used as monomer component b), and vinyl acetate, vinyl propionate, ethylene glycol monovinyl ether, and/or methyl vinyl ether are used as monomer component c).

11. The process for the production of biodegradable polymers suitable for detergents and cleaners according to claim 6, wherein the hydrolysis or saponification is carried out with alkali hydroxides in the presence of hydrogen peroxide or with sulfur dioxide.

12. The biodegradable polymers suitable for detergents and cleaners according to claim 1, wherein said polymers comprise 25–550-wt. of monoethylenically unsaturated $C_{4-8}$ dicarboxylic acids, and wherein said carboxylic acids are at least partially neutralized.

13. The biodegradable polymers suitable for detergents and cleaners according to claim 1, wherein said polymers comprise 30–60%-wt. monoethylenically unsaturated $C_{3-10}$ monocarboxylic acids, and wherein said carboxylic acids are at least partially neutralized.

14. The biodegradable polymers suitable for detergents and cleaners according to claim 1, wherein said polymers comprise 8–30%-wt. monounsaturated monomers which, after hydrolysis or saponification, have one or more hydroxyl groups covalently bonded to the C-C-chain.

15. A detergent or cleaning agent, comprising the biodegradable polymers of claim 1 and a detergent or cleaning agent.

16. A bleach composition, comprising the polymers of claim 1 and a bleach.

* * * * *